(12) United States Patent
Ahn et al.

(10) Patent No.: US 10,170,780 B2
(45) Date of Patent: Jan. 1, 2019

(54) FURNACE WITH AN INTEGRATED FLAME ASSISTED FUEL CELL FOR COMBINED HEATING AND POWER

(71) Applicants: Jeongmin Ahn, Manlius, NY (US); H. Ezzat Khalifa, Manlius, NY (US)

(72) Inventors: Jeongmin Ahn, Manlius, NY (US); H. Ezzat Khalifa, Manlius, NY (US)

(73) Assignee: SYRACUSE UNIVERSITY, Syracuse, NY (US)

(*) Notice: Subject to any disclaimer, the term of this patent is extended or adjusted under 35 U.S.C. 154(b) by 478 days.

(21) Appl. No.: 14/301,099

(22) Filed: Jun. 10, 2014

(65) Prior Publication Data

US 2014/0363776 A1     Dec. 11, 2014

Related U.S. Application Data

(60) Provisional application No. 61/833,181, filed on Jun. 10, 2013.

(51) Int. Cl.
*H01M 8/04082* (2016.01)
*H01M 8/243* (2016.01)
*H01M 8/04007* (2016.01)
*H01M 8/0612* (2016.01)
*H01M 8/124* (2016.01)

(52) U.S. Cl.
CPC ... *H01M 8/04201* (2013.01); *H01M 8/04074* (2013.01); *H01M 8/0631* (2013.01); *H01M 8/243* (2013.01); *H01M 2008/1293* (2013.01); *H01M 2250/20* (2013.01); *H01M 2250/405* (2013.01); *Y02B 90/16* (2013.01); *Y02E 60/525* (2013.01); *Y02T 90/32* (2013.01)

(58) Field of Classification Search
CPC ...... F24H 2240/10; H01M 2008/1293; H01M 2250/40; H01M 2250/405; H01M 8/04201; H01M 8/243; H01M 8/04074; H01M 8/0631; H01M 2250/20; Y02B 90/16; Y02T 90/16; Y02E 60/525
USPC .......... 432/92, 227; 429/120, 415, 452, 454, 429/466
See application file for complete search history.

(56) References Cited

U.S. PATENT DOCUMENTS

| | | | |
|---|---|---|---|
| 3,150,657 A * | 9/1964 | Shultz, Jr. | F24H 3/065 122/1 R |
| 6,221,522 B1 * | 4/2001 | Zafred | H01M 8/0252 429/434 |
| 6,255,010 B1 | 7/2001 | George et al. | |
| 7,470,480 B2 | 12/2008 | Horiuchi et al. | |
| 2006/0134486 A1 * | 6/2006 | Horiuchi | H01M 8/04022 429/441 |
| 2007/0099065 A1 * | 5/2007 | Rawson | H01M 8/0232 429/468 |

(Continued)

FOREIGN PATENT DOCUMENTS

JP     H06196176     7/1994

*Primary Examiner* — Steven B McAllister
*Assistant Examiner* — Benjamin W Johnson
(74) *Attorney, Agent, or Firm* — Bond Schoeneck & King, PLLC; George McGuire; Frederick Price

(57) ABSTRACT

The present invention relates to a flame-assisted fuel cell (FFC) and, more particularly, to the integration of a FFC in a fuel fired furnace or boiler to enable the generation of both electricity and heat from the fuel's chemical energy, transforming the furnace/boiler into a Combined Heating and Power (CHP) system.

6 Claims, 5 Drawing Sheets

(56) References Cited

U.S. PATENT DOCUMENTS

2010/0203399 A1\* 8/2010 Poshusta ........... H01M 8/04089
429/408

\* cited by examiner

FURNACE WITH AN INTEGRATED FLAME ASSISTED FUEL CELL FOR COMBINED HEATING AND POWER

RELATED APPLICATION DATA

The present application claims priority to and the benefit of U.S. provisional patent application No. 61/833,181, filed Jun. 10, 2013, and is hereby incorporated by reference in its entirety.

BACKGROUND OF THE INVENTION

1. Field of the Invention

The present invention relates to a flame-assisted fuel cell (FFC) and, more particularly, to the integration of a FFC in a fuel fired furnace or boiler to enable the generation of both electricity and heat from the fuel's chemical energy, transforming the furnace/boiler into a Combined Heating and Power (CHP) system.

2. Description of the Related Art

Increased electricity consumption in the United States has been a growing problem that is only expected to increase in the future. A recent release from the United States Energy Information Administration forecasts growth in electricity consumption at an average annual rate of 0.9% between now and 2040. This projected growth will be made possible by a number of factors, the most significant of which is hydraulic fracturing techniques which have revitalized the United States natural gas industry. Combating this problem will require new solutions that improve the efficiency of the conversion from thermal energy to electrical energy.

One of the older solutions to this problem is to improve the efficiency of electricity generation by using the waste heat in a Combined Heat and Power (CHP) system. Such systems make use of the high quality waste heat to improve the overall efficiency of the system from the high 30's to the high 80's. The main challenge with these systems is transporting the heat across large distances to areas where it can be useful. Such issues have not been a challenge for large industries where the use of a large CHP system can be economical. However, the size and cost of such systems have made it difficult for the technology to impact the residential market.

Fuel cells provide a clean and versatile means to directly convert chemical energy to electricity. Among the many types of fuel cells, solid-oxide fuel cells (SOFCs) have received considerable attention owing to their simplicity (no moving parts), fuel flexibility and use of inexpensive catalytic materials. Unlike conventional CHP systems, which are complicated, noisy and dirty due to the use of internal conventional engines (moving parts), and have not been successfully scaled down to match the needs of a single family house or a small commercial building, SOFCs are all-solid electrochemical devices which can convert chemical energy to electricity directly in a highly efficient, silent and low-emission way. There is no liquid electrolyte with its attendant material corrosion and electrolyte management problems. The high operating temperature (500~1000° C.) allows internal reforming, promotes rapid kinetics with nonprecious materials, and yields high quality by product heat for cogeneration. The total efficiency of cogeneration system can be reached ~80%—far beyond the conventional power production system.

Conventional SOFCs are operated with a split cell, dual-chamber configuration: the anode chamber supplied with fuel and the cathode chamber with air. The dual-chamber SOFC (DC-SOFC) does not require catalytically selective electrodes, since the electrodes are exposed to separate gas streams, and is generally considered to be the technology of choice for large-scale stationary power generation. Although the conventional dual-chamber SOFCs (DC-SOFCs) show great potential as an electrical power generator, they are not widely applied due to high costs and difficulties in sealing. In addition, SOFCs are not considered suitable for applications that require frequent and rapid start-up and shut-down, as frequent heating and cooling cycles can cause internal stresses due to thermal expansion of the cell components and sealant. The single-chamber SOFC (SCSOFC) concept was proposed to address these issues, but the SC-SOFC is limited in fuel flexibility. Both DC-SOFCs and SC-SOFCs need external heating to maintain optimal operating temperatures since they rely on thermal catalysis. Furthermore, a fuel reformer or an evaporator is needed to avoid carbon coking in the fuel cell. These challenges have limited the application of SOFCs for compact and portable power generation.

Description of the Related Art Section Disclaimer: To the extent that specific publications are discussed above in this Description of the Related Art Section, these discussions should not be taken as an admission that the discussed publications are prior art for patent law purposes. For example, some or all of the discussed publications may not be sufficiently early in time, may not reflect subject matter developed early enough in time and/or may not be sufficiently enabling so as to amount to prior art for patent law purposes. To the extent that specific publications are discussed above in this Description of the Related Art Section (as well as throughout the application), they are all hereby incorporated by reference into this document in their respective entirety(ies).

SUMMARY OF THE INVENTION

Various embodiments of the present invention may be advantageous in that they may solve or reduce one or more of the potential problems and/or disadvantages discussed above. Embodiments of the present recognizes that new developments in SOFCs, notably the FFC design, have the potential to overcome the issues referenced above (e.g., simplify the geometric difficulties in conventional SOFC systems and eliminate sealing problems), enabling the use of SOFCs for a wide variety of commercial applications. The operation principle of the FFC is based on the combination of a flame with a SOFC in a simple, "no-chamber" or "unsealed" chamber setup. The flame serves as fuel-flexible partial oxidation reformer, while simultaneously providing the heat required for SOFC operation. In the combined system, flame and fuel cell are inherently coupled.

Various embodiments of the present invention may exhibit one or more of the following objects, features and/or advantages:

It is a principal object and advantage of the present invention to provide a furnace with an integrated FFC for combined heating and power that can be used to offset the cost of expensive utility power, levelize electric demand, charge electric vehicles and plug-in hybrid vehicles, and assist homeowners/businesses when there is a loss of heat/air conditioning during storms and disruptive weather events.

It is another object and advantage of the present invention to provide a furnace with an integrated FFC for combined heating and power that has no moving parts associated with the FFC, and is particularly scalable to the small (fractional to a few kW) CHP applications.

It is another object and advantage of the present invention to provide a furnace with an integrated FFC for combined heating and power that has residential, commercial, and industrial applications where both heating and electricity are required, and/or where furnaces, boilers or other combustion heating devices are present.

In accordance with the foregoing objects and advantages, an embodiment of the present invention is directed to the integration of a FFC in a fuel fired furnace (e.g., gas-fired upflow furnace) or boiler to enable the generation of both electricity and heat from the fuel's chemical energy, transforming the furnace/boiler into a CHP system (FFC-µCHP). The electricity produced by the FFC ensures that the integrated system (including a battery) can be independent of the electric grid and can continue to operate even during long durations of grid power interruptions, as well as to displace some of the electricity purchased from the electric utility. The DC voltage of the power generated by the fuel cell is determined by the number of such cells connected in series. Some of the output may be stored in a battery for use at a later time (e.g., utility peak hours) when needed, and to allow restart after a shut down.

The main benefits of fuel fired furnace with the FFC system of an embodiment of the present invention results from the increased efficiency of the CHP system as compared to traditional power plant electricity generation. Furthermore, heating can still be provided for the residential market through a combination of heat given off by the FFCs and the heat from combustion in the burners. This system is not necessarily meant to create a new CHP market. Rather, this system can take the existing furnace market and improve upon it by adding the benefits of CHP in a residential environment. The FFC can be integrated with the furnace burners in a modified setup to allow staged combustion with a slightly rich 1st stage/FFC, then a leaner 2nd stage to complete combustion in the flues. Combustion in both stages will produce the heat needed for the heat exchanger as well as the heat needed for SOFC operation.

The use of such systems in a residential environment can reduce the electricity needed from power plants for this sector. This reduction in the need for electricity has the potential of offsetting the increased electricity consumption in the United States which can reduce the number of power plants that need to be developed. At the same time, the total chemical energy of the fuel can be used more efficiently because it is being used for heating near the site of electricity generation. The net effect can be a reduction in total domestic energy usage because of the large efficiency increase resulting from the CHP system. The ongoing expansion of the domestic natural gas market can allow this technology of an embodiment of the present invention to become a feasible option for the future.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
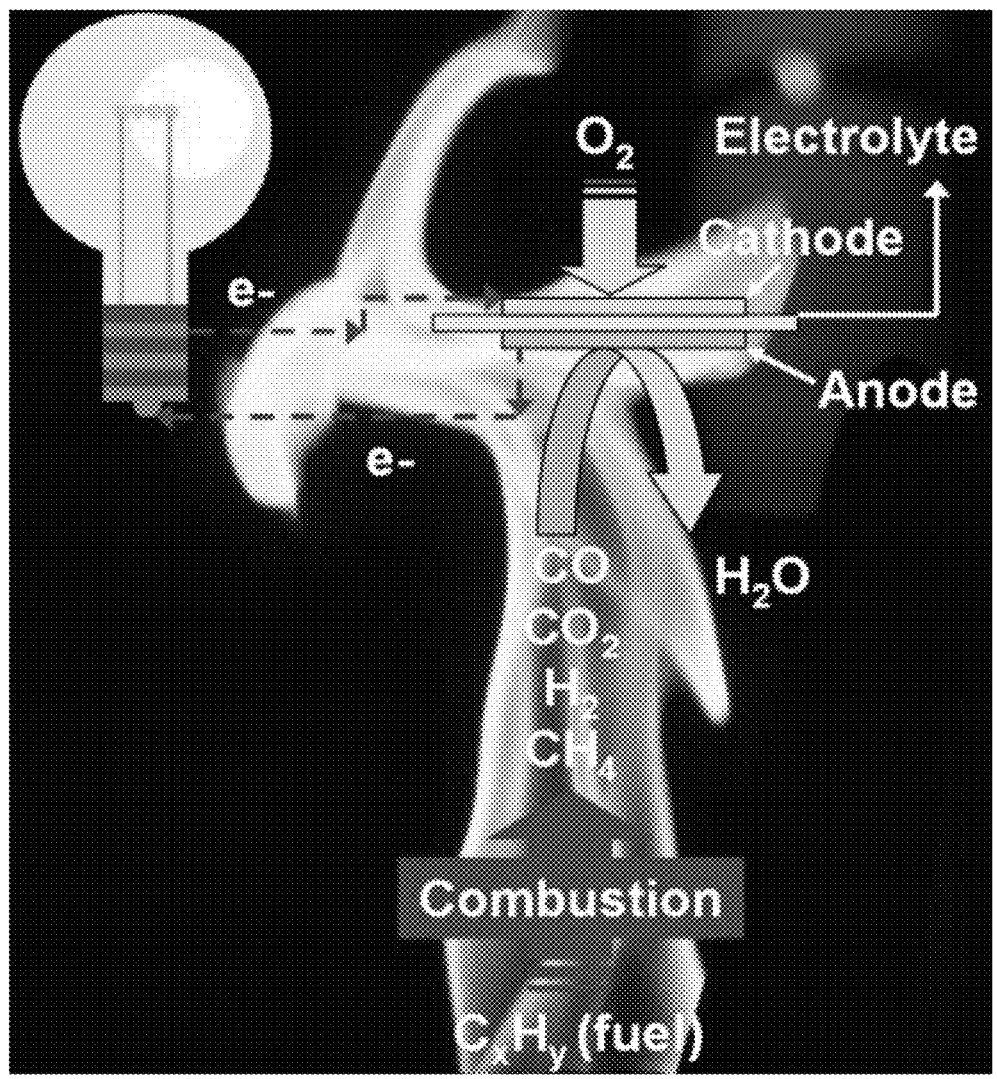
FIG. 1 is a schematic illustration of a flame fuel cell.
Figure 2:
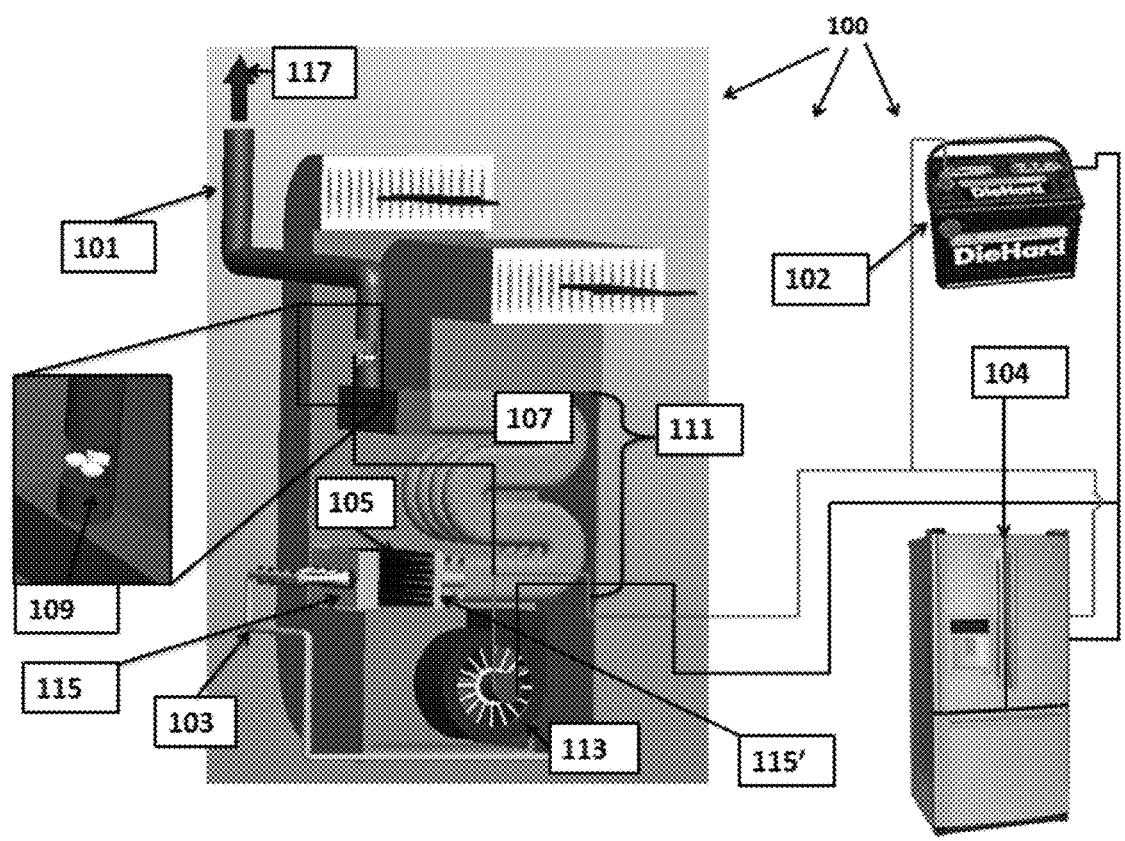
FIG. 2 is a schematic illustration of applications of a furnace with an integrated FFC system, according to an embodiment of the present invention.
Figure 3:
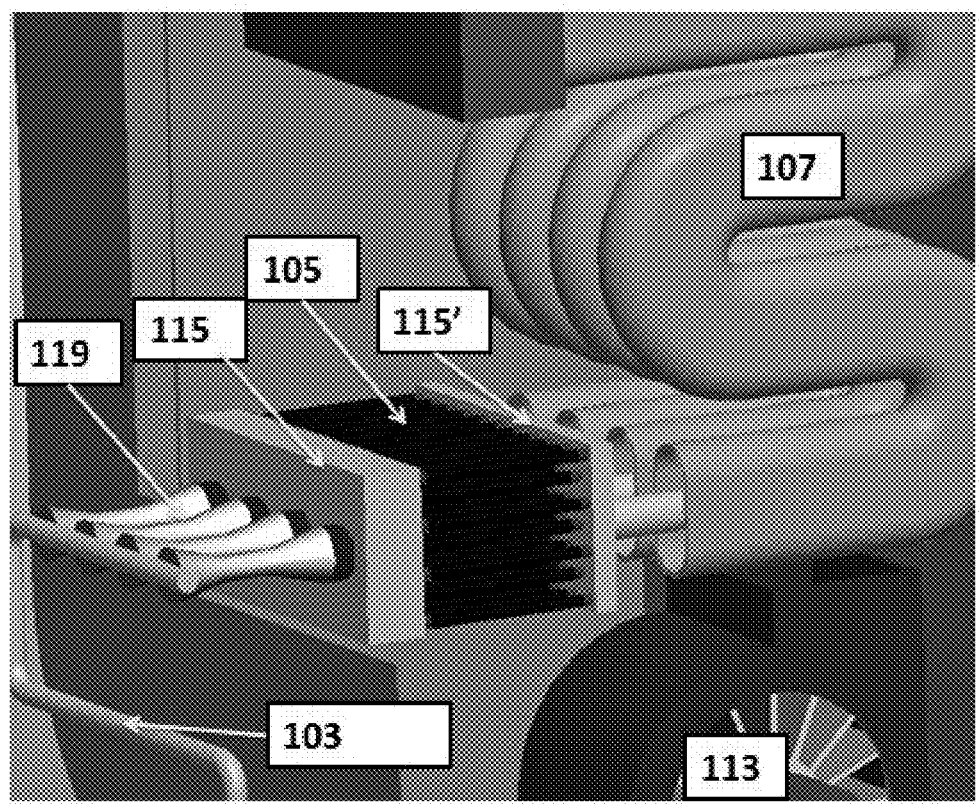
FIG. 3 is a schematic illustration of a close-up of a burner, FFC and flue subsystem, according to an embodiment of the present invention.
Figure 4:
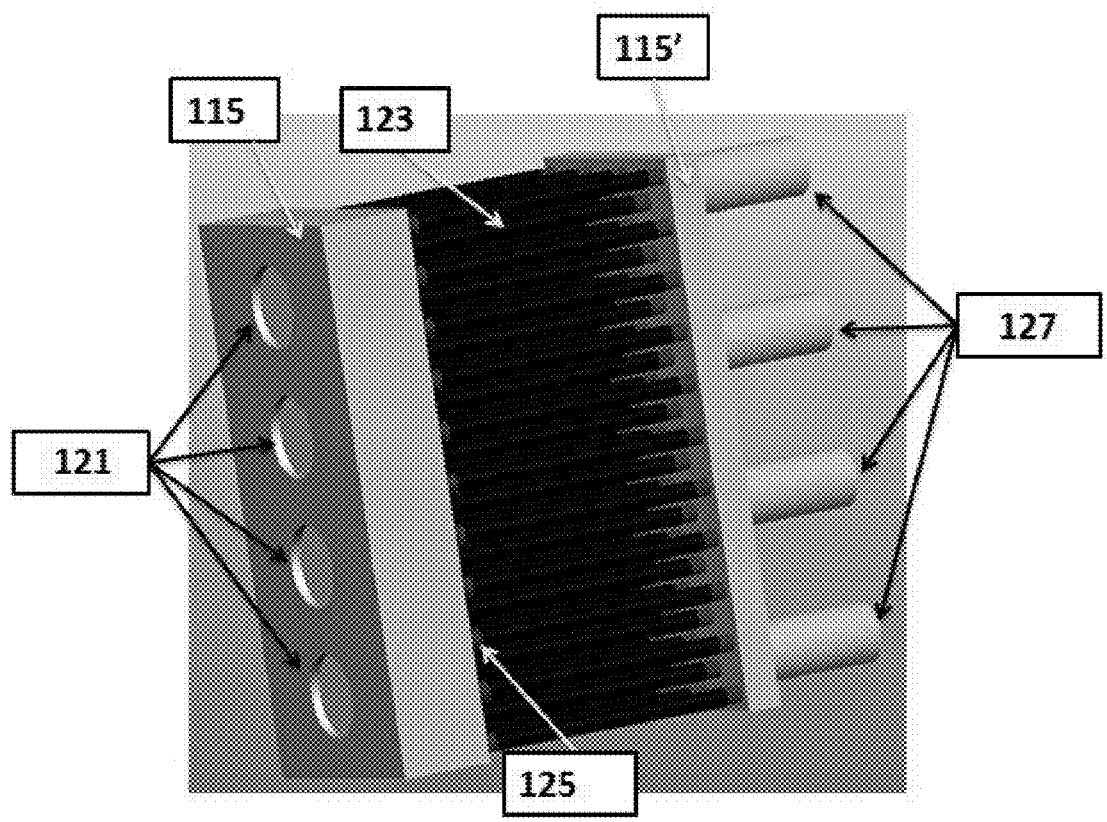
FIG. 4 is a schematic illustration of a FFC array, according to an embodiment of the present invention.

The present invention will be more fully understood and appreciated by reading the following Detailed Description in conjunction with the accompanying drawings, wherein like reference numerals refer to like components.

As shown in the Figures and described herein, A FFC module is integrated in a fuel-fired furnace to enable the generation of both electricity and heat from the fuel's chemical energy, transforming the furnace into a FFC-µCHP, in accordance with an embodiment of the present invention. The integrated FFC power generation system of an embodiment of the present invention features numerous advantages compared to alternative power generation methods. The integrated FFC power generation system's design is simple, compact, and can yield a high power density device. Due to its simple design, it can be easily be scaled to achieve high power outputs. The system is applicable to a variety of commercial applications as a fuel-flexible power generator. For example, it can be easily integrated into three-way converters or exhaust ducts of furnaces, automobiles, or even airplanes to remove partially combusted gas from the exhaust stream. Thus, the integrated FFC power generation system can improve thermal efficiencies, lower emissions and provide a more energy secure future. The system can also be combined with existing combustion engines as an auxiliary power generation device, operating on exhaust gases for enhanced thermodynamic efficiency.

A FFC is described below in conjunction with FIG. 1, followed by a description of the integration of an FFC module 105 in a fuel-fired furnace in conjunction additional FIGS. 2-5.

Turning to FIG. 1, an example of an unsealed FFC is shown. There are a number of advantages of a FFC: (1) Simple setup: the FFC can be operated in a no-chamber setup, such that the anode is simply held into the exhaust gases of a combustion flame, and the cathode breathes ambient air; (2) Rapid startup: the flame heat release brings the fuel cell rapidly to its operation temperature. Since no sealant is needed for the FFC, the mismatch of thermal expansion between sealant and fuel cell can be neglected. Thus, the FFC can be operated with frequent starts and shut downs following with rapid increases and decreases of fuel cell temperature without cracking, which is essentially compatible with the operation of house furnace; (3) Fuel versatility: since the intermediate species produced by the flame are similar for a wide variety of hydrocarbon fuels, the FFC is highly flexible in fuel selection.

As shown and described herein with respect to FIGS. 2-5, in accordance with an embodiment of the present invention, the integration of a FFC module 105 in a fuel-fired furnace or a boiler to enable the generation of both electricity and heat from the fuel chemical energy, transforming the furnace/boiler into a Combined Heating and Power (CHP) system (or integrated FFC power generation system) 100 is provided. In particular, FIGS. 2, 3, 4 and 5 illustrate an embodiment of this concept and details as applied to a home heating furnace. In brief, an integrated FFC module 105 is shown and can consist of an array of fuel cells arranged in this example as a bundle of cylindrical concentric anodes 125 and cathodes 123. It is noted that the FFC module 105 is preferably not sealed in a combustor.

The integrated FFC module/bundle 105 is connected to mixing chambers 115/115' on the inlet and the outlet ends, respectively. Mixing chamber 115 is connected to a gas line 103 through in-shot burners 119 that are attached to combustions gas inlets 121 of the mixing chamber 115. Mixing chamber 115' is connected to flue 107 through the outlet to the flue 127. Fan 113, heat exchanger 111, exhaust fan 109, exhaust pipe 101, hot exhaust 117 out of system, battery 102 and refrigerator 104 are also shown.

In the described design, the FFC module 105 can be placed in the downstream of in-shot burner 119 right before the flue 107. The high temperature exhaust gas from in-shot burners 119 can contain syngas and unburned fuels, which can be directly used for FFC module 105 operation. The air required for FFC module 105 operation can be the same air required for combustion in the flue 107. The unreacted exhaust from the FFC module 105 can mix with air in the flue 107 for a lean combustion. As a result, any residual fuel is completely oxidized, releasing its energy to bring the heat exchanger 111 up to operating temperature, which will consequently heat the indoor air. FFC module 105 can be connected in series and parallel combinations to achieve the desired DC voltage and power level. This can be dictated by the requirements of the various electric loads to be powered by the fuel cell (blowers, fans, lights, appliances, battery chargers, etc.) It is also possible to invert some of the DC power into 60 Hz AC to power other AC house loads that require AC power that require AC power. Specifically, the electricity produced by the furnace integrated FFC (FFC-μCHP) can be used to, for example: 1) power the furnace blower 113 (~200 W to 500 W in a typical home heating furnace), making the furnace independent of grid power and ensuring continued supply of heat if grid power is interrupted due to a snow storm or other disruptive weather events; 2) supply the host building with electricity (~1-2 kW in home heating application) to offset potentially expensive grid power, and assure continued electric supply for essential home services during grid power interruption; 3) charge a battery to reduce a building's electric demand, to power an essential appliance such as a refrigerator or freezer 104, or to restart the FFC-μCHP system during a grid power outage.

The anodes 125 of the FFC module 105 are shown exposed to a fuel-rich flame emanating from an in-shot burner. The unburned portion of the fuel in this fuel-rich flame supply is the fuel to be oxidized in the FFC module 105 electrochemical conversion process. The oxidant ($O_2$) is extracted from the combustion air that flows outside the FFC assembly on the cathode 123 side. Perfect sealing of the anode and cathode sides in this arrangement is not necessary since the FFC module 105 can convert to electricity only a small portion of the fuel energy (~100,000 Btu/h in a typical home heating furnace). As noted herein, the unburned, un-oxidized residual fuel exiting the FFC module 105, mixes with secondary air to complete the combustion of the fuel as it enters the furnace flues 107 and supplies heat to the indoor air that is forced to flow outside the flues 107 by means of a blower/fan 113.

Figure 5:
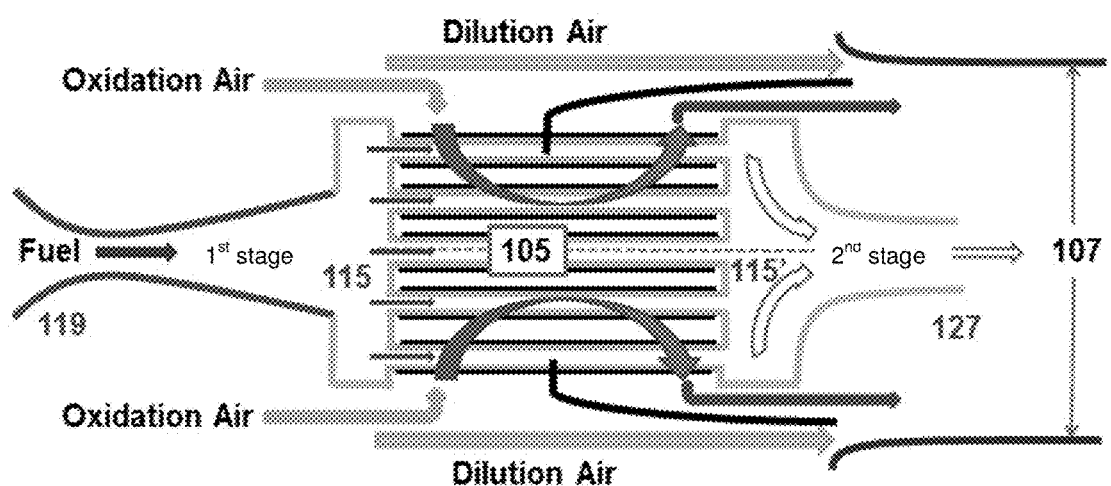
FIG. 5 is a schematic illustration of the details of a burner, FFC and flue subsystem, according to an embodiment of the present invention.

The details in FIG. 5 show one possible arrangement of the in-shot burner 119 supplying heat and fuel for the FFC bundle's 105 operation, the secondary air flowing over the FFC bundle 105 then entering the flue 107 where it mixes with and nearly completely oxidizes the residual fuel, releasing its energy to effect the indoor air or domestic water heating. The conventional furnace typically runs at fuel-lean combustion using an in-shot burner to utilize all the fuels. Such a lean combustion results in almost zero available fuels for FFC Module 105 operation in the exhaust. Thus, a fuel-rich combustion in the in-shot burner 119 is preferable to provide enough fuel for FFC module 105 operation. Here, in accordance with an embodiment of the present invention, it should be noted that the fuel-rich combustion in the in-shot burner 119 only happens in the $1^{st}$ stage combustion (left side of FFC module in FIG. 5). The remainder of the system is still operated at fuel-lean condition. The excess air introduction in the $2^{nd}$ stage combustion (right side of FFC module in FIG. 5) will burn all the remainder of the fuel from FFC Module's 105 exhaust.

Since it is preferable that the FFC module 105 have a fuel-rich mixture, it is preferable that the combustion process is staged, with the initial/first stage of incomplete combustion, producing both heat and excess fuel to suit the needs of the FFC module 105, followed by dilution to effect complete combustion and heat release for heating air or water, as discussed above and shown in part in FIG. 5. The DC voltage of the power generated by the fuel cell is determined by the number of such cells connected in series. Some of the output may be stored in a battery for use at a later time when needed, and to allow restart after a shut down.

The tubular configuration of the FFC module 105 described above can reduce the chance of anode gas diffusion to the cathode 123 and is easy to scale up. Additionally, tubular SOFC technology has been proven to operate for roughly 70,000 h with less than 0.5% voltage degradation per 1000 operating hours. The anode-supported FFC module 105 can also increase the resistance of thermal shocking and achieve much better performance due to its thin electrolyte compared to electrolyte supported FFCs, according to an embodiment of the present invention.

The tubular FFC module 105 can be fabricated by extrusion and dip coating. The supported anode 125 can be fabricated using ram extrusion. Then the electrolyte can be coated on the anode 125 by dip coating. The cathode 123 can also be coated onto the Yittria-stabilized $ZrO_2$ (YSZ) layer using dip coating followed by sintering process.

Materials for the FFC module 105 (described below) can include, but are not limited to: YSZ as the electrolyte materials due to its high mechanical strength and high stability at high temperatures and reduced atmosphere; for the fuel cell cathode, $La_{0.8}Sr_{0.2}MnO_{3-\delta}$ (LSM) can be applied due to its good compatibility with YSZ; and the anode can use a mixture of NiO and YSZ. These materials are readily available from market.

It is noted that the FFC power generation system of an embodiment of the present invention offers many benefits. This novel concept provides an alternative method of powering homes' electrical systems while still generating the necessary heating capacity for occupant's thermal comfort. The use of natural gas changes the traditional power distribution infrastructure by allowing onsite production of electricity in a residential environment. This change comes at an important time when domestic production of gas has expanded rapidly due to the use of hydraulic fracturing techniques. Furthermore, there are economic factors that encourage the use of natural gas over electricity. In part of Upstate New York alone, for example, some of the best electricity supply rates are more than four times higher than natural gas supply rates on a per MMBtu basis. This trend is expected to continue because much of the projected growth in electricity generation will be the result of increased natural gas use in power plants. Even if the prices for natural gas begin to increase, the electricity rates will probably have to increase proportionally. Residential consumers will have the incentive of purchasing natural gas at a lower rate while also producing electricity at maximum efficiency levels through CHP. Overall, the economic incentive along with the availability of gas promotes a more independent energy future for the United States.

The electricity generated by the described system has several immediate uses within a house without ever creating a need for energy storage. Running a furnace blower (~200 W) and a typical household refrigerator (~300 W) can use about half of the electricity produced. These systems are good candidates for the FFC-μCHP because they are consistent loads that operate throughout the day. Additionally, energy can be stored in a battery for use during morning or evening hours when more electricity is used for lights, stoves and other household appliances. This stored energy has the potential of offsetting the traditional peak hours of electricity consumption. By storing energy for peak periods, the load on the grid will be significantly reduced, which will further lessen the need for additional power plants and the associated infrastructure. Savings will also occur in the typical household utility bill because household electricity is often billed based upon on-peak or off-peak hours of operation.

Thus far, the emphasis of the FFC-μCHP has been placed on the residential market. However, the addition of additional FFC power generation systems can allow for more electricity production. Additional large burners and different heat exchangers can also be used to vary the heating capacity of the furnace system. Both of these upgrades will make this product feasible in an industrial setting where large furnaces are common and often operate for a much larger fraction of the total time. The use of this concept in an industrial setting provides all of the benefits described above. However, energy storage may be unlikely as the FFC-μCHP will operate at the same time as production and may only offset a portion of the daily facility load. Besides producing high efficiency electricity and heat, the FFC-μCHP can also save industrial facilities in demand related charges by offsetting the load during peak hours of operation. These savings are typically on the order of 10-14 $/kW for an industrial facility which is a large portion of their electricity bill.

Additionally, the same concept can be applied to a hot water heater or boiler for the same net effect. Boilers and hot water heaters are both extremely common in industrial facilities and households. The equipment is slightly different, as the heat exchanger is used to heat water and not air. However, the same basic operating principles are involved as a burner will undergo combustion bringing the FFCs and heat exchanger to operating temperature for the net result of CHP. As boilers tend to be more common in industrial facilities than furnaces, the application to industry could be larger than the FFC-μCHP in the same industrial market.

While several embodiments of the invention have been discussed, it will be appreciated by those skilled in the art that various modifications and variations of the present invention are possible. Such modifications do not depart from the spirit and scope of the present invention.

What is claimed is:

1. A fuel fired furnace system comprising:
   a plurality of in-shot burners;
   a plurality of flues;
   a blower; and
   an integrated flame-assisted fuel cell (FFC) module comprising an anode-supported flame-assisted fuel cell positioned in between and connected to a first mixing chamber and a second mixing chamber, wherein the anode-supported flame-assisted fuel cell comprises a cathode disposed on an anode,
   wherein the first mixing chamber is connected to each of the plurality of in-shot burners on a front side of the first mixing chamber and connected to the anode-supported flame assisted fuel cell on a back side of the first mixing chamber,
   wherein the second mixing chamber is connected to the anode-supported flame assisted fuel cell on a front side of the second mixing chamber and has a plurality of openings on a back side of the second mixing chamber that each feed one of the plurality of flues,
   wherein the plurality of in-shot burners are configured to fire a fuel-rich flame into the first mixing chamber and supply the anode of the anode-supported flame assisted fuel cell with an un-used portion of fuel via the first mixing chamber,
   wherein the un-used portion of fuel includes: unburned, un-oxidized residual fuel and partially-oxidized residual fuel;
   wherein the FFC module is not sealed in a combustor such that it is open to ambient air,
   wherein the cathode is configured and located to receive an oxidant from the ambient air,
   wherein the plurality of flues are configured to receive the un-used portion of fuel from the second mixing chamber and receive the oxidant from an area outside of the second mixing chamber,
   wherein the fuel fired furnace system is configured such that the un-used portion of fuel and oxidant react upon entering the plurality of flues thereby generating heat within the plurality of flues; and
   wherein the blower is configured to blow air over the plurality of flues to facilitate heat exchange between the air and the plurality of flues.

2. The system of claim 1, wherein said FFC module further comprises a plurality of anode-supported flame-assisted fuel cells, arranged in an array configuration, that comprise cylindrical concentric anodes and cathodes.

3. The system of claim 1, wherein said first mixing chamber further comprises a plurality of combustion gas inlets.

4. The system of claim 3, wherein each of said plurality of in-shot burners is connected to one of said plurality of combustion gas inlets.

5. The system of claim 4, further comprising a gas line attached to inlet ends of said plurality of in-shot burners.

6. The system of claim 1, wherein each flue at least partially overlaps an outlet of the second mixing chamber.

* * * * *